US008159572B2

(12) United States Patent
Kondo

(10) Patent No.: US 8,159,572 B2
(45) Date of Patent: Apr. 17, 2012

(54) IMAGE PICKUP APPARATUS, APPARATUS AND METHOD FOR PROCESSING INFORMATION, PROGRAM, AND PROGRAM RECORDING MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 11/909,587

(22) PCT Filed: Mar. 22, 2006

(86) PCT No.: PCT/JP2006/305675
§ 371 (c)(1),
(2), (4) Date: Jul. 8, 2008

(87) PCT Pub. No.: WO2006/101112
PCT Pub. Date: Sep. 28, 2006

(65) Prior Publication Data
US 2009/0201378 A1    Aug. 13, 2009

(30) Foreign Application Priority Data

Mar. 22, 2005 (JP) ................ P2005-081648

(51) Int. Cl.
*H04N 5/247* (2006.01)
*H04N 9/09* (2006.01)
(52) U.S. Cl. ...................... 348/264; 348/262
(58) Field of Classification Search .......... 348/46–50, 348/231.99–231.6, 262–265, 333.01–344, 348/211.99–211.14
See application file for complete search history.

(56) References Cited

U.S. PATENT DOCUMENTS 5,699,108 A    12/1997  Katayama et al.
6,639,626 B1 *  10/2003  Kubo et al. ............. 348/218.1
(Continued)

FOREIGN PATENT DOCUMENTS
EP           1047264          10/2000
(Continued)

OTHER PUBLICATIONS

European Office Action issued on Nov. 25, 2009, for corresponding European Patent Application EP 06729642.

*Primary Examiner* — Sinh Tran
*Assistant Examiner* — Mark Monk
(74) *Attorney, Agent, or Firm* — K&L Gates LLP

(57) ABSTRACT

An image pickup apparatus, an apparatus and a method for processing information, a program, and a program recording medium that can provide a user with an image optimum for the user are provided. A recording medium 4 records a large-size image and a playback parameter thereon. The large-size image has an angle of view wider than that of a normal image that a user intends to be captured and a resolution higher than that of the normal image, where the entirety of an area of a scene captured in the normal image is captured in the large-size image. The playback parameter includes information indicative of a region of the large-size image in which the area of the scene captured in the normal image is captured. An image extracting unit 22 extracts a partial image from the large-size image on the basis of the playback parameter and outputs the extracted image to a display unit 3 as an extraction image. The display unit 3 displays the extraction image. On the other hand, a playback parameter processing unit 24 generates a new playback parameter in accordance with a user operation through an operation unit 26. In such a case, the image extracting unit 22 extracts an extraction image on the basis of the new playback parameter. The present invention is applicable to, for example, apparatuses for recording and playing back an image.

4 Claims, 8 Drawing Sheets

U.S. PATENT DOCUMENTS

| | | |
|---|---|---|
| 2002/0030749 A1 | 3/2002 | Nakamura et al. |
| 2003/0071891 A1 | 4/2003 | Geng |
| 2004/0008773 A1* | 1/2004 | Itokawa .................. 375/240.08 |
| 2005/0185049 A1* | 8/2005 | Iwai et al. ....................... 348/47 |
| 2006/0187322 A1* | 8/2006 | Janson et al. ............ 348/240.99 |
| 2007/0146503 A1* | 6/2007 | Shiraki ...................... 348/231.3 |

FOREIGN PATENT DOCUMENTS

| | | |
|---|---|---|
| JP | 06-006669 | 1/1994 |
| JP | 06-189176 | 7/1994 |
| JP | 2000-270297 | 9/2000 |
| JP | 2000-350079 | 12/2000 |
| JP | 2002-369066 | 12/2002 |
| JP | 2003-179785 | 6/2003 |
| JP | 2003298919 | 10/2003 |
| JP | 2004-007284 | 1/2004 |
| JP | 2004-282296 | 10/2004 |
| JP | 2005-003752 | 1/2005 |
| JP | 2005-012423 | 1/2005 |
| JP | 2005-039777 | 1/2005 |

\* cited by examiner

IMAGE PICKUP APPARATUS, APPARATUS AND METHOD FOR PROCESSING INFORMATION, PROGRAM, AND PROGRAM RECORDING MEDIUM

TECHNICAL FIELD

The present invention relates to an image pickup apparatus, an apparatus and a method for processing information, a program, and a program recording medium and, in particular, to an image pickup apparatus, an apparatus and a method for processing information, a program, and a program recording medium that can provide a user with an optimum image.

BACKGROUND ART

For example, in video cameras, an image (image data) obtained by capturing an image is encoded using the DV (digital video) format or the MPEG (moving picture experts group) format and is recorded on a recording medium, such as a tape or a disk.

In general, video cameras have a zoom function. Using the zoom function, the video cameras can change the angle of view of a captured image (the angle of view of the area of a scene captured in an image) (magnification ratio). That is, for example, when a user carries out a zoom-in operation and captures an image, an image having a narrow angle of view, that is, a close-up (magnified) image of an object can be obtained. In contrast, when a user carries out a zoom-out operation and captures an image, a wide-angle image in which a wider area of a scene is captured can be obtained.

Existing video cameras can change the angle of view by carrying out the above-described zoom operation (the zoom-in or zoom-out operation), but cannot concurrently capture images having different angles of view because existing video cameras include only one image capturing means for capturing an image and output the captured image.

Accordingly, a video camera including two image capturing means so as to capture an image having a narrow angle of view and an image having a wide angle of view at the same time has been proposed (refer to, for example, Patent Document 1).

[Patent Document 1] Japanese Unexamined Patent Application Publication No. 2004-282296

DISCLOSURE OF INVENTION

Problems to be Solved by the Invention

A user captures a desired image of an object while viewing an image displayed on, for example, a finder of a video camera. Accordingly, the user misses the chance to capture all the areas of a scene outside an area of the scene captured in the image displayed on the finder (e.g., a scene of an event that accidentally happens outside an area of the scene being captured).

In addition, even when a user plays back images captured by the video camera, the user cannot view the scene outside the scene captured in the image.

As noted above, when a user captures an image using a video camera, the user cannot view an area of a scene outside an area of the scene appearing in the image captured by the video camera. Accordingly, the captured image is not always optimum for the user.

Accordingly, the present invention provides a user with an image optimized for the user.

Means for Solving the Problems

According to the present invention, an image pickup apparatus includes first image pickup means for outputting a first image, second image pickup means for outputting a second image, where the second image has an angle of view wider than that of the first image and a resolution higher than that of the first image and at least the entirety of an area of a scene captured in the first image is captured in the second image, display means for displaying the first image, generating means for detecting a region of the second image in which the scene captured in the first image is captured and generating a playback parameter including information at least indicative of the region, and output control means for outputting the second image and the playback parameter.

According to the present invention, a first method for processing information includes the steps of detecting a region of a second image in which the scene captured in a first image is captured and generating a playback parameter including information at least indicative of the region, where the second image has an angle of view wider than that of the first image and a resolution higher than that of the first image and at least the entirety of an area of a scene captured in the first image is captured in the second image, and outputting the second image and the playback parameter.

According to the present invention, a first program includes the steps of detecting a region of a second image in which the scene captured in a first image is captured and generating a playback parameter including information at least indicative of the region, where the second image has an angle of view wider than that of the first image and a resolution higher than that of the first image and at least the entirety of an area of a scene captured in the first image is captured in the second image, and outputting the second image and the playback parameter.

According to the present invention, a first program recording medium stores a program. The program includes the steps of detecting a region of a second image in which the scene captured in a first image is captured and generating a playback parameter including information at least indicative of the region, where the second image has an angle of view wider than that of the first image and a resolution higher than that of the first image and at least the entirety of an area of a scene captured in the first image is captured in the second image, and outputting the second image and the playback parameter.

According to the present invention, an information processing apparatus includes playback control means for generating a second image and a playback parameter from a data recording medium that records the second image and the playback parameter, where the second image has an angle of view wider than that of a first image and a resolution higher than that of the first image, at least the entirety of an area of a scene captured in the first image is captured in the second image, and the playback parameter includes information at least indicative of a region of the second image in which the area of a scene captured in the first image is captured, extracting means for extracting at least a partial image of the second image and outputting the image as an extraction image, and playback parameter generating means for generating a new playback parameter in accordance with a user operation, and recording control means for recording the new playback parameter. When the new playback parameter is generated, the extracting means extracts the extraction image on the basis of the new playback parameter.

According to the present invention, a second method for processing information includes the steps of reconstructing a second image and a playback parameter from a data recording medium that records the second image and the playback parameter, where the second image has an angle of view wider than that of a first image and a resolution higher than that of the first image, at least the entirety of an area of a scene captured in the first image is captured in the second image, and the playback parameter includes information at least indicative of a region of the second image in which the area of a scene captured in the first image is captured, extracting at least a partial image of the second image and outputting the image as an extraction image, generating a new playback parameter in accordance with a user operation, and recording the new playback parameter. When the new playback parameter is generated, the extraction image is extracted on the basis of the new playback parameter in the step of extracting at least a partial image of the second image.

According to the present invention, a second program includes the steps of reconstructing a second image and a playback parameter from a data recording medium that records the second image and the playback parameter, where the second image has an angle of view wider than that of a first image and a resolution higher than that of the first image, at least the entirety of an area of a scene captured in the first image is captured in the second image, and the playback parameter includes information at least indicative of a region of the second image in which the area of a scene captured in the first image is captured, extracting at least a partial image of the second image and outputting the image as an extraction image, generating a new playback parameter in accordance with a user operation, and recording the new playback parameter. When the new playback parameter is generated, the extraction image is extracted on the basis of the new playback parameter in the step of extracting at least a partial image of the second image.

According to the present invention, a second program recording medium stores a program. The program includes the steps of reconstructing a second image and a playback parameter from a data recording medium that records the second image and the playback parameter, where the second image has an angle of view wider than that of a first image and a resolution higher than that of the first image, at least the entirety of an area of a scene captured in the first image is captured in the second image, and the playback parameter includes information at least indicative of a region of the second image in which the area of a scene captured in the first image is captured, extracting at least a partial image of the second image and outputting the image as an extraction image, generating a new playback parameter in accordance with a user operation, and recording the new playback parameter. When the new playback parameter is generated, the extraction image is extracted on the basis of the new playback parameter in the step of extracting at least a partial image of the second image.

According to the present invention, the image pickup apparatus, the first method for processing information, the first program, and the program recorded on the first program recording medium detect a region of a second image in which a scene captured in a first image is captured, where the second image has an angle of view wider than that of the first image and a resolution higher than that of the first image and at least the entirety of an area of a scene captured in the first image is captured in the second image, generate a playback parameter including information at least indicative of the region, and output the second image and the playback parameter.

According to the present invention, the information processing apparatus, the second method for processing information, the second program, and the program recorded on the second program recording medium reconstruct a second image and a playback parameter from a data recording medium that records the second image and the playback parameter, where the second image has an angle of view wider than that of a first image and a resolution higher than that of the first image, at least the entirety of an area of a scene captured in the first image is captured in the second image, and the playback parameter includes information at least indicative of a region of the second image in which the area of a scene captured in the first image is captured, extract at least a partial image of the second image, and output the image as an extraction image. In addition, the information processing apparatus, the second method for processing information, the second program, and the program recorded on the second program recording medium generate a new playback parameter in accordance with a user operation, and record the new playback parameter. When the new playback parameter is generated, the extraction image is extracted on the basis of the new playback parameter.

Advantages

According to the present invention, an image optimum for a user can be provided to the user.

Figure 1:
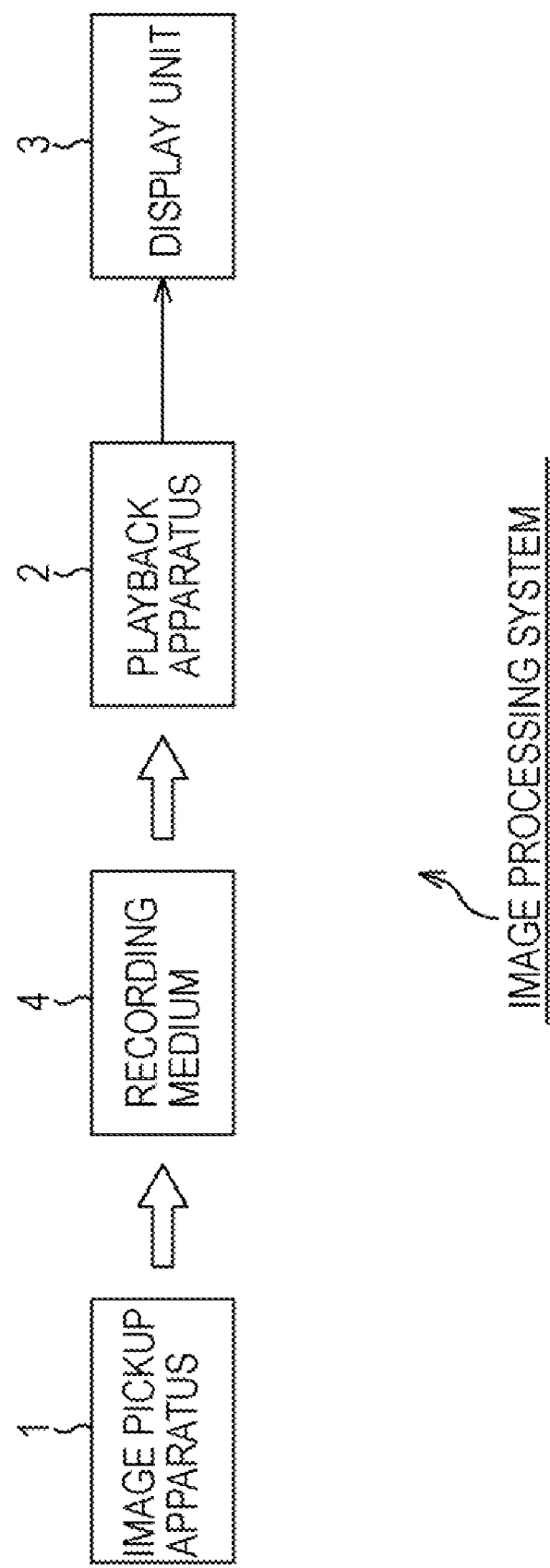
FIG. 1 is a block diagram illustrating an exemplary configuration of an image processing system according to an embodiment of the present invention.

REFERENCE NUMERALS 1 image pickup apparatus
2 playback apparatus
3 display unit
4 recording medium
11 normal camera unit
12 normal signal processing unit
13 display unit
14 wide-angle camera unit
15 operation unit
16 sensor
17 controller
17A CPU
17B RAM
17C EEPROM
18 recording unit
21 recording and playback unit
22 image extracting unit
23 signal processing unit
24 playback parameter processing unit
25 playback parameter storage unit
26 operation unit 101 bus
102 CPU
103 ROM
104 RAM
105 hard disk
106 output unit
107 input unit
108 communication unit
109 drive
110 input/output interface
111 removable recording medium

BEST MODE FOR CARRYING OUT THE
INVENTION

Embodiments of the present invention are described below with reference to the accompanying drawings.

FIG. 1 illustrates an exemplary configuration of an image processing system according to an embodiment of the present invention. As used herein, the term "system" refers to a logical combination of a plurality of devices; the plurality of devices is not necessarily included in one body.

An image pickup apparatus 1 is, for example, a so-called video camera. The image pickup apparatus 1 captures an image in response to a user operation. Subsequently, the image pickup apparatus 1 records, on a recording medium 4, the captured image (image data) and playback parameters used for playing back the image.

A playback apparatus 2 played the image and the playback parameters recorded on the recording medium 4 back. Subsequently, the playback apparatus 2 extracts a predetermined area of the image from the image played back from the recording medium 4 on the basis of the playback parameter. Thereafter, the playback apparatus 2 supplies the predetermined area of the image to a display unit 3.

The display unit 3 is formed from, for example, a cathode ray tube (CRT) or a liquid crystal display (LCD). The display unit 3 displays an image supplied from the playback apparatus 2.

Examples of the recording medium 4 include a magnetic tape, a magnetic disk, an optical disk, a magnetooptical disk, and a semiconductor memory. The recording medium 4 is removably mounted in the image pickup apparatus 1 or the playback apparatus 2. Alternatively, the recording medium 4 can be incorporated in the image pickup apparatus 1. In such a case, the image pickup apparatus 1 can reconstruct an image recorded on the recording medium 4 and transfer the image to the playback apparatus 2. Alternatively, the recording medium 4 can be incorporated in the playback apparatus 2. In such a case, an image acquired by the image pickup apparatus 1 is transferred from the image pickup apparatus 1 to the playback apparatus 2. The playback apparatus 2 can then record the image on the recording medium 4.

Figure 2:
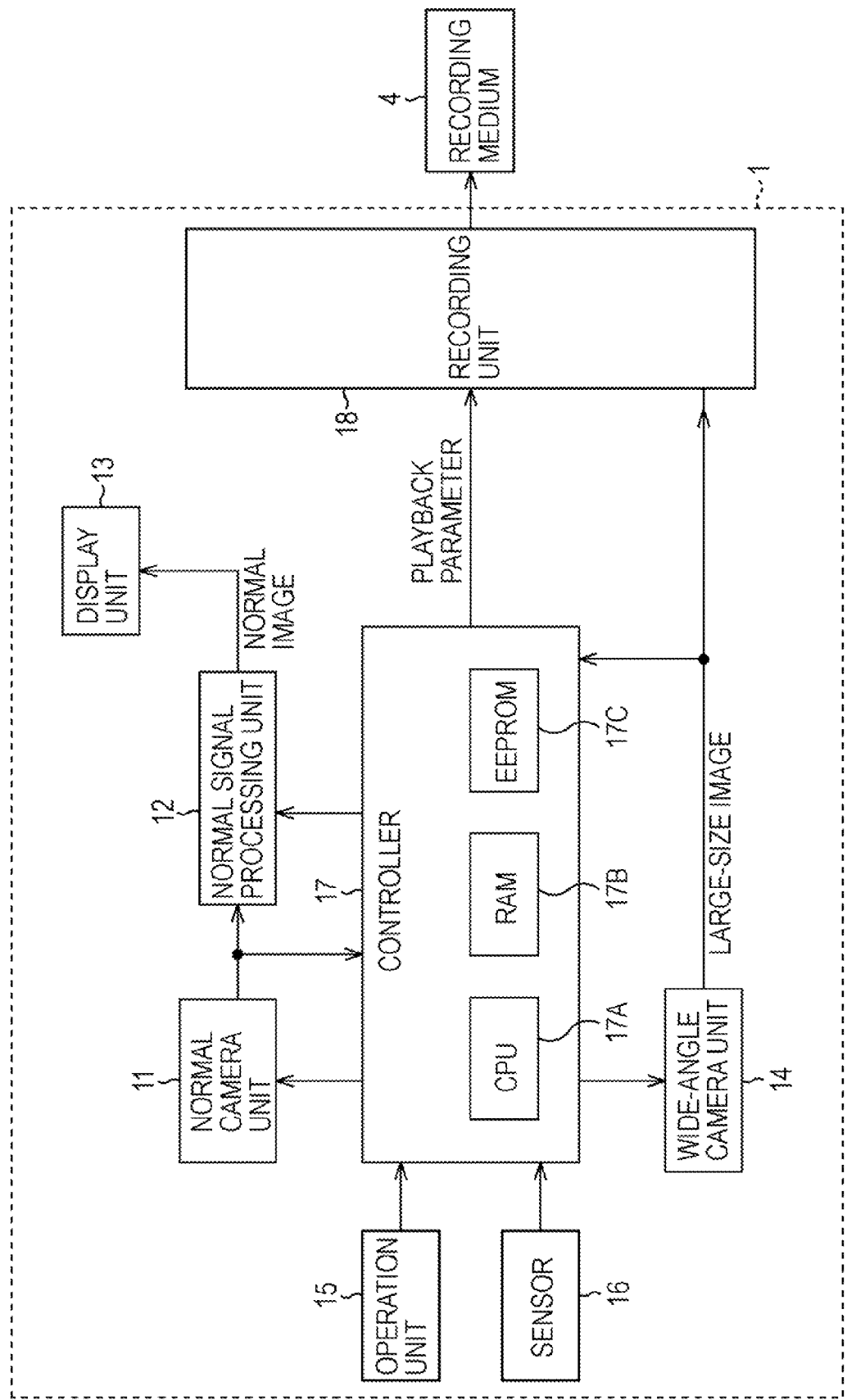
FIG. 2 is a block diagram illustrating an exemplary configuration of an image pickup apparatus 1.

FIG. 2 illustrates an exemplary configuration of the image pickup apparatus 1 shown in FIG. 1.

In general, a normal camera unit 11 includes an optical system, which is widely used in existing video cameras, and a photoelectric transducer, such as a charged coupled device (CCD) imager or a complementary metal oxide semiconductor (CMOS) imager. The normal camera unit 11 photoelectrically converts light made incident thereon and outputs an image (data) under the control of a controller 17.

In addition, the normal camera unit 11 includes, for example, an optical zoom mechanism. When a zoom-in operation or a zoom-out operation is performed using an operation unit 15, the controller 17 controls the zoom mechanism of the normal camera unit 11 in accordance with the zoom-in operation or the zoom-out operation. The normal camera unit 11 drives the optical system disposed therein under the control of the controller 17. In this way, the normal camera unit 11 captures an image of a narrow or wide angle of view and outputs the image of this angle of view.

As used herein, the image that is captured and output by the normal camera unit 11 is referred to as a "normal image" as needed.

In general, the normal image output from the normal camera unit 11 is supplied to a normal signal processing unit 12 and the controller 17. The normal signal processing unit 12 performs signal processing on the normal image supplied from the normal camera unit 11 in accordance with the control of the controller 17. Thereafter, the normal signal processing unit 12 supplies the normal image to a display unit 13.

Examples of the signal processing performed by the normal signal processing unit 12 include noise reduction and image stabilization. The signal processing performed by the normal signal processing unit 12 can be set by, for example, operating the operation unit 15. The controller 17 controls the normal signal processing unit 12 in accordance with the setting.

The display unit 13 is a monitor (or a finder) used by a user in order to monitor an image (a normal image) captured by the normal camera unit 11. The display unit 13 displays the normal image supplied from the normal signal processing unit 12 (the normal image subjected to signal processing performed by the normal signal processing unit 12).

A wide-angle camera unit 14 photoelectrically converts a light beam made incident thereon under the control of the controller 17. Thereafter, the wide-angle camera unit 14 outputs an image (data) to the controller 17 and a recording unit 18.

The wide-angle camera unit 14 outputs an image having an angle of view wider than that of the normal image captured by the normal camera unit 11 and having a resolution higher than that of the normal image. In addition, the image output from the wide-angle camera unit 14 (hereinafter also referred to as a "large-size image") includes at least the entirety of an area of a scene captured in the normal image. The wide-angle camera unit 14 includes an optical system and a photoelectric transducer that can capture such a large-size image.

To acquire an image having an angle of view wider than that of a normal image, a method can be employed in which, for example, a wide-angle lens, such as a fisheye lens, is used for the optical system of the wide-angle camera unit 14, or an omnidirectional camera is used for the wide-angle camera unit 14. Alternatively, by arranging a plurality of camera units so that the image capturing directions thereof are slightly different from one another and connecting images output from the camera units together, an image having an angle of view wider than that of the normal image can be acquired.

To acquire an image having a resolution higher than that of a normal image, a method can be employed in which, for example, a photoelectric transducer having pixels smaller than those of the normal camera unit 11 and having the number of the pixels more than that of the normal camera unit 11 is employed for the photoelectric transducer of the wide-angle camera unit 14.

In addition, to allow a large-size image to include at least the entirety of an area of a scene captured in the normal image, the normal camera unit 11 and the wide-angle camera unit 14 can be disposed so that, when the normal camera unit 11 captures an image having the widest angle of view, the wide-angle camera unit 14 can capture at least the entire scene captured in that image.

Furthermore, for example, when an omnidirectional camera is employed for the wide-angle camera unit 14 and a wide-angle large-size image is captured by the omnidirectional camera, the wide-angle large-size image has an annular shape (a circular image). Accordingly, the wide-angle camera unit 14 converts the circular image to a central projection image (a panoramic image) and outputs the converted image. When the wide-angle camera unit 14 acquires a wide-angle large-size image using a fisheye lens, a similar process is performed.

It is desirable that the large-size image has a sufficiently wide angle of view and a sufficiently high resolution compared with the normal image.

The operation unit 15 is operated by a user when the user instructs, for example, starting of recording the image on the recording medium 4, stopping of the recording operation, or zoom-in or zoom-out operation of the normal camera unit 11. At that time, the operation unit 15 supplies an operation signal corresponding to the user operation to the controller 17. As used herein, the operations of the operation unit 15 to instruct the normal camera unit 11 to zoom in and zoom out are referred to as a "zoom-in operation" and a "zoom-out operation", respectively. Hereinafter, the zoom-in operation and the zoom-out operation are collectively referred to as a "zoom operation" as needed.

A sensor 16 is, for example, an acceleration sensor. The sensor 16 senses information about the motion of the image pickup apparatus 1 and supplies the sensed information to the controller 17.

The controller 17 includes a central processing unit (CPU) 17A, a random access unit (RAM) 17B, and an electrically erasable programmable read only memory (EEPROM) 17C. The CPU 17A executes a program stored in the EEPROM 17C so as to control components of the image pickup apparatus 1.

That is, the CPU 17A loads the program stored in the EEPROM 17C into the RAM 17B and executes the program. Thus, a variety of processing is performed. The RAM 17B temporarily stores a program executed by the CPU 17A and data required for the operation of the CPU 17A. The EEPROM 17C stores a program executed by the CPU 17A and data to be stored even after the image pickup apparatus 1 is powered off.

The program executed by the CPU 17A is preinstalled in the EEPROM 17C. In addition, the program can be temporarily or permanently stored (recorded) on a removable recording medium 111, which is described below. Thereafter, the program can be installed in the EEPROM 17C from the removable recording medium 111. Furthermore, the program can be wirelessly transferred from a download site to the image pickup apparatus 1 via an artificial satellite for digital satellite broadcast or can be transferred from a download site by wire via a network, such as a local area network (LAN) or the Internet. The image pickup apparatus 1 can receive the program transferred in such a way using a communication interface (I/F) (not shown) and can install the program in the EEPROM 17C.

As noted above, the CPU 17A executes the program so that the controller 17 controls the normal camera unit 11, the wide-angle camera unit 14, and the recording unit 18.

In addition, the controller 17 detects a region of the large-size image supplied from the wide-angle camera unit 14 in which the scene captured in the normal image supplied from the normal camera unit 11 is captured. Hereinafter, the region is also referred to as a "region corresponding to a normal image". Thereafter, the controller 17 generates a playback parameter including at least information indicative of the region. The controller 17 then supplies the playback parameter to the recording unit 81.

That is, the controller 17 performs matching between a normal image and a large-size image while changing the size of the normal image and a position in the large-size image from which the normal image is matched. Thus, the controller 17 determines the size of the normal image and the position at which the normal image is best matched with the large-size image and, more specifically, the size of the normal image and the position in the large-size image at which the sum of absolute differences between the pixel values of pixels of the normal image and the pixel values of pixels of the large-size image located at the same positions as the pixels of the normal image is minimized, for example. In this way, the controller 17 detects a region of the large-size image identified by the determined size and position as a region corresponding to the normal image.

Note that the controller 17 coarsely determines the position of the region of the large-size image corresponding to the normal image using a positional relationship between the normal camera unit 11 and the wide-angle camera unit 14. In addition, the controller 17 coarsely determines the size of the region of the large-size image corresponding to the normal image using the state of the zoom mechanism of the normal camera unit 11. Subsequently, the controller 17 performs the matching between the normal image and the large-size image while changing the position and the size of the normal image on the basis of the coarse position and size.

Furthermore, the controller 17 determines whether a pan operation or a tilt operation of the image pickup apparatus 1 is performed. Thus, the playback parameter generated by the controller 17 can include information about a region of the large-size image corresponding to the normal image, information about the pan or tilt operation of the image pickup apparatus 1, and information about the state of the zoom mechanism of the normal camera unit 11 (e.g., the magnification ratio).

Under the control of the controller 17, the recording unit 18 outputs the large-size image supplied from the wide-angle camera unit 14 and the playback parameter supplied from the controller 17 to the recording medium 4 so that the large-size image and the playback parameter are recorded on the recording medium 4.

The operation of the image pickup apparatus 1 shown in FIG. 2 is described next with reference to a flow chart shown in FIG. 3.

When a user operates the operation unit 15 of the image pickup apparatus 1 so as to power on the image pickup apparatus 1, the normal camera unit 11 and the wide-angle camera unit 14 start capturing an image. Thus, the normal camera unit 11 starts outputting the captured normal image while the wide-angle camera unit 14 starts outputting the captured large-size image.

The normal image output from the normal camera unit 11 is supplied to the normal signal processing unit 12 and the controller 17. While, the large-size image output from the wide-angle camera unit 14 is supplied to the controller 17 and the recording unit 18. The normal signal processing unit 12 performs signal processing on the normal image output from the normal camera unit 11 and supplies the normal image to the display unit 13. Accordingly, the display unit 13 displays the normal image in the form of a so-called through image. For example, the user views the normal image displayed on the display unit 13 so as to identify an object whose image is to be captured.

Thereafter, at step S1, the controller 17 controls the recording unit 18 to start recording (outputting) the large-size image output from the wide-angle camera unit 14 on the recording medium 4. Subsequently, the process proceeds to step S2.

At step S2, the controller 17 determines whether the operation unit 15 is operated by the user to start recording an image (i.e., whether a recording operation is performed by the user). If, at step S2, it is determined that a recording operation has not been performed, the process proceeds to step S3. At step S3, the controller 17 determines whether the operation unit 15 is operated by the user to turn off the power (i.e., whether a power-off operation is performed by the user).

If, at step S3, it is determined that a power-off operation has not been performed, the process returns to step S2. Subsequently, similar processes are repeated.

However, if, at step S2, it is determined that the recording operation has been performed, that is, the user views the normal image displayed on the display unit 13 and carries out a recording operation to start recording the scene in the normal image, the process proceeds to step S4. At step S4, the controller 17 starts generating a playback parameter using the normal image output from the normal camera unit 11 and the large-size image output from the wide-angle camera unit 14.

That is, the controller 17 detects the region corresponding to the normal image output from the normal camera unit 11 from the large-size image output from the wide-angle camera unit 14. Thereafter, the controller 17 generates the playback parameter including the information indicative of the region and the information indicative of the details of the signal processing performed on the normal image.

Subsequently, the process proceeds to step S5. At step S5, the controller 17 starts recording the playback parameter started to be generated at step S4 on the recording medium 4. That is, the controller 17 controls the recording unit 18 to start recording (outputting) the playback parameter generated by the controller 17 on the recording medium 4.

Here, for simplicity, the frame rate of the normal image output from the normal camera unit 11 is the same as that of the large-size image output from the wide-angle camera unit 14. In addition, the frame (the image data of the frame) of the normal image and the frame (the image data of the frame) of the large-size image are output at the same timing (phase). The playback parameter is generated on a frame-to-frame basis. The frame-based playback parameter is recorded on the recording medium 4.

After the recording operation of the playback parameter is started at step S5, the process proceeds to step S6. At step S6, the controller 17 determines whether the user has stopped an image recording operation (the user has performed a stop operation). If, at step S6, it is determined that the stop operation has not been performed, the process proceeds to step S7. At step S7, the controller 17 determines whether the operation unit 15 has been operated by the user to perform a power-off operation.

If, at step S7, it is determined that the power-off operation has not been performed, the process returns to step S6. Subsequently, similar processes are repeated.

However, if, at step S6, it is determined that the stop operation has been performed, the process proceeds to step S8. At step S8, the controller 17 stops generating the playback parameter, which was started at step S4. In addition, the controller 17 stops recording the playback parameter, which was started at step S5. Thereafter, the process returns from step S8 to step S2. Subsequently, similar processes are repeated.

In contrast, if, at step S3 or S7, it is determined that a power-off operation has been performed, the process proceeds to step S9. At step S9, the controller 17 controls the recording unit 18 to stop recording the large-size image, which was started at step S1. In addition, the controller 17 instructs the normal camera unit 11 and the wide-angle camera unit 14 to stop capturing the image. Thereafter, the controller 17 stops processing thereof.

As described above, in the image pickup apparatus 1, the large-size image continues to be recorded on the recording medium 4 while the image pickup apparatus 1 is powered on. In addition, once a recording operation is performed, the playback parameter continues to be recorded until a stop operation is performed.

As mentioned earlier, since the large-size image is a wide-angle image containing at least the entirety of an area of a scene captured in the normal image, the large-size image also contains a scene outside the scene captured in the normal image. Furthermore, the large-size image is recorded even before the recording operation is performed and even after the stop operation is performed.

Accordingly, in the image pickup apparatus 1, a large-size image containing not only a scene (a scene captured in the normal image) that the user intends to be captured (recorded) but also a plurality of other scenes is recorded on the recording medium 4 together with the playback parameter.

Additionally, in the image pickup apparatus 1, although signal processing, such as image stabilization and noise reduction, is performed on the normal image, such signal processing is not performed on the large-size image. Therefore, the large-size image that is not subjected to such signal processing is recorded on the recording medium 4.

Furthermore, in the image pickup apparatus 1, the large-size image and the playback parameter are being recorded on the recording medium 4 from a time when an image recording operation is performed to a time when a stop operation is performed. At that time, for example, the large-size image and the playback parameter may be multiplexed together into one file or may be recorded as separate files.

Figure 3:
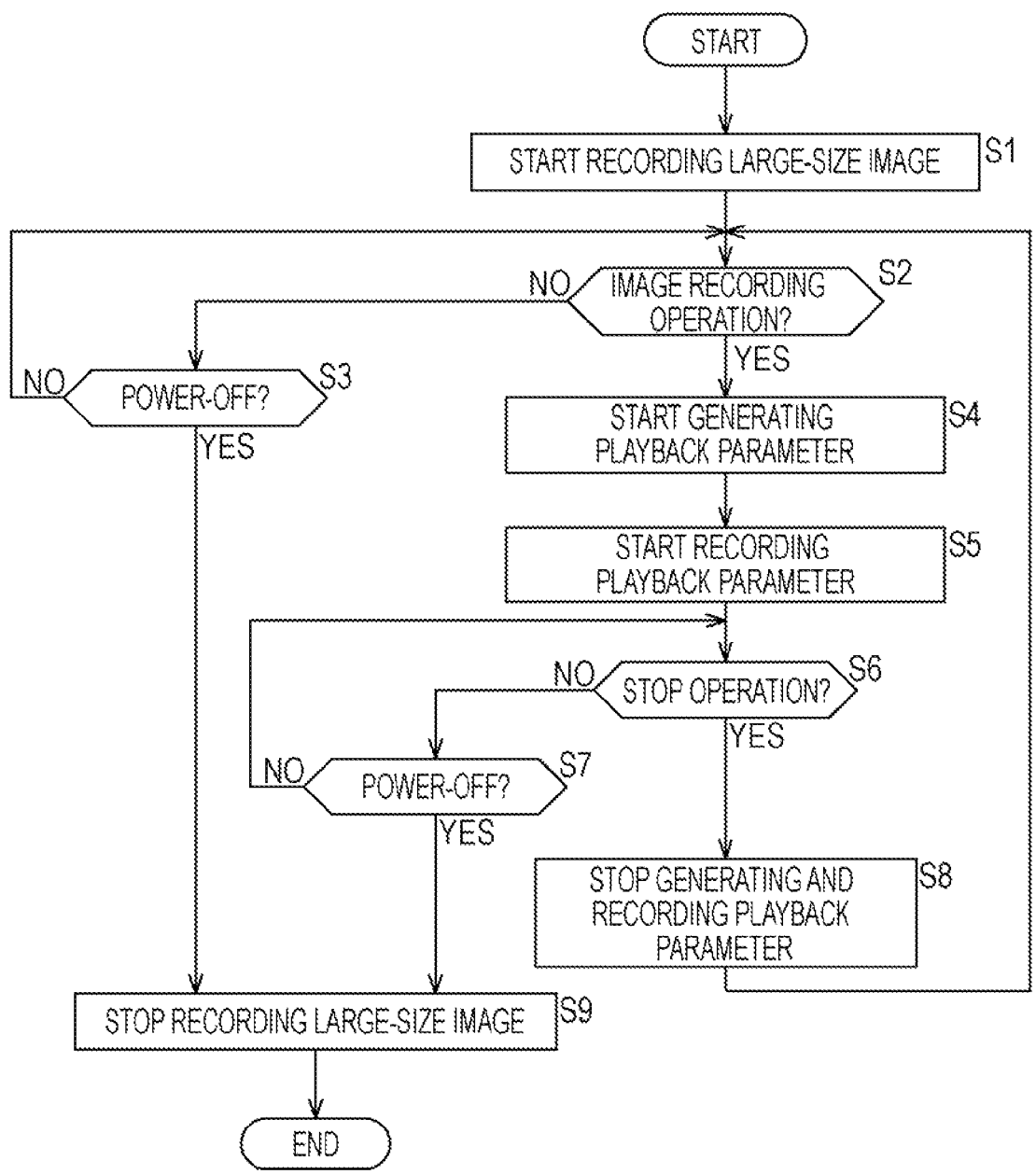
FIG. 3 is a flow chart illustrating the operation of the image pickup apparatus 1.

Still furthermore, in FIG. 3, the large-size image is recorded from a time when the image pickup apparatus 1 is powered on to a time when the image pickup apparatus 1 is powered off. Accordingly, a problem relating to the capacity of the recording medium 4 may arise. However, in the near future, the capacity of the recording medium 4 could possibly significantly increase, and therefore, the capacity problem of the recording medium 4 may not be serious. However, since the capacity of the recording medium 4 is still limited, the large-size image can be recorded from a time a predetermined period before the image recording operation is performed to a time a predetermined period after the stop operation is performed during the time period from a time when the image pickup apparatus 1 is powered on to a time when the image pickup apparatus 1 is powered off. This can be achieved by deleting a part of the large-size image recorded from the time when the image pickup apparatus 1 is powered on to the time the predetermined period before the image recording operation is performed and a part of the large-size image recorded from the time the predetermined period after the stop operation is performed (i.e., a part of the large-size image recorded from a time a predetermined period before the next image recording operation is performed).

Figure 4:
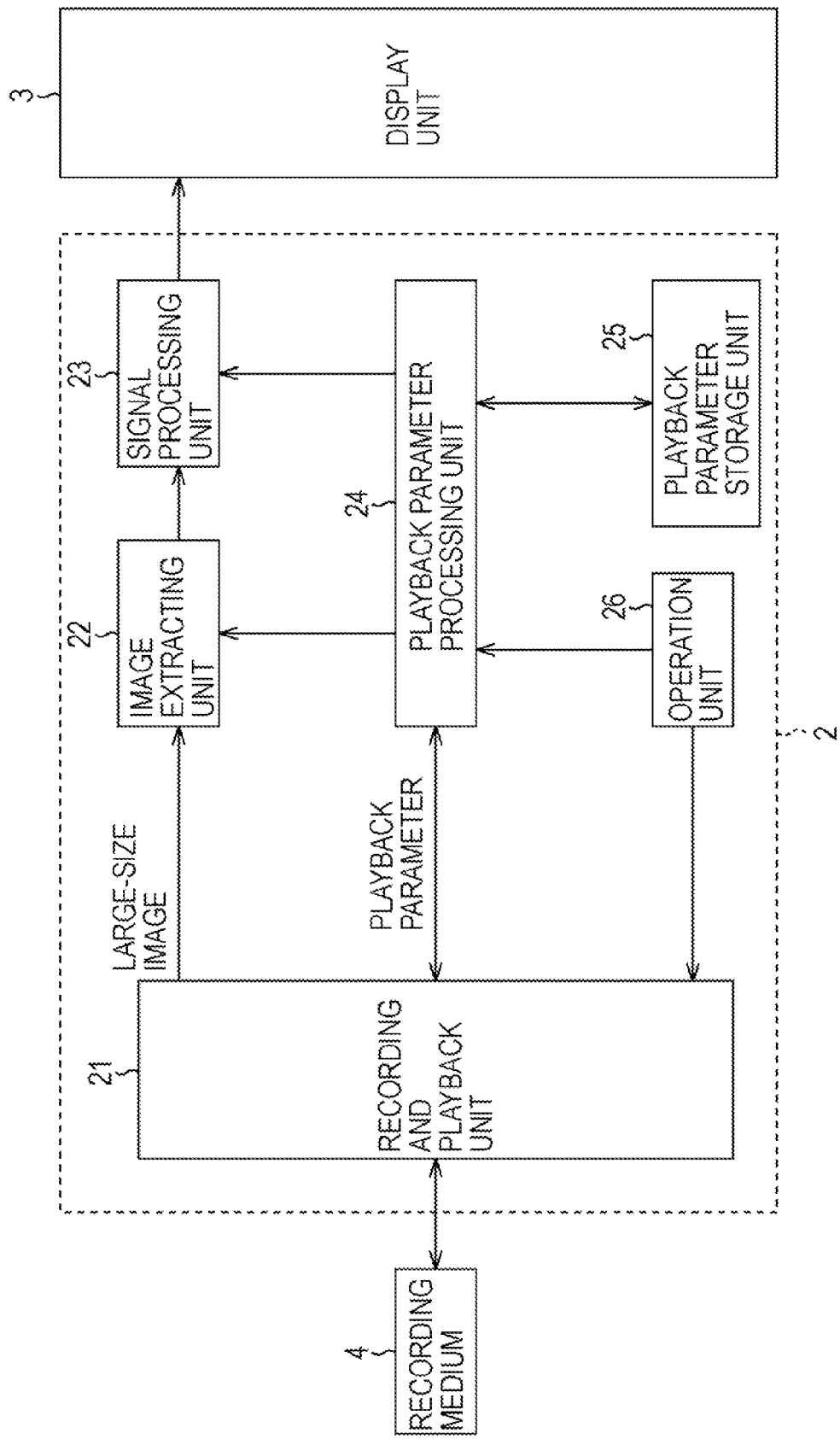
FIG. 4 is a block diagram illustrating an exemplary configuration of a playback apparatus 2.

FIG. 4 illustrates an exemplary configuration of the playback apparatus 2 shown in FIG. 1.

A recording and playback unit 21 played the large-size image and the playback parameter on the recording medium 4 back in response to, for example, a user operation through an operation unit 26. Thereafter, the recording and playback unit 21 supplies the large-size image to an image extracting unit 22 and supplies the playback parameter to a playback parameter processing unit 24. In addition, the recording and playback unit 21 records a playback parameter supplied from the playback parameter processing unit 24 on the recording medium 4.

The image extracting unit 22 extracts at least part of the large-size image supplied from the recording and playback unit 21 on the basis of the playback parameter supplied from the playback parameter processing unit 24. Thereafter, the image extracting unit 22 outputs the extracted image (hereinafter also referred to as an "extraction image") to a signal processing unit 23.

That is, the playback parameter contains information indicative of a rectangular region in the large-size image. For example, the information includes the horizontal length and the vertical length of the rectangular region and the coordinates of the upper left corner of the rectangular region. The image extracting unit 22 identifies the rectangular region (hereinafter also referred to as an "extraction window") indicated by the information contained in the playback parameter. Subsequently, the image extracting unit 22 extracts the image in the extraction window from the large-size image as an extraction image. The image extracting unit 22 then supplies the extraction image to the signal processing unit 23.

In the image pickup apparatus 1 shown in FIG. 2, the playback parameter that is generated by the controller 17 and that is recorded on the recording medium 4 contains the information indicative of a region in the large-size image corresponding to the normal image. Using the playback parameter, the region indicated by the information, that is, the region in the large-size image corresponding to the normal image is identified as an extraction window.

The signal processing unit 23 performs signal processing on the extraction image supplied from the image extracting unit 22 using the playback parameter supplied from the playback parameter processing unit 24. Thereafter, the signal processing unit 23 supplies the extraction image to the display unit 3. Thus, the extraction image subjected to the image processing in the signal processing unit 23 is displayed on the display unit 3.

The playback parameter processing unit 24 receives the playback parameter from the recording and playback unit 21 and supplies the playback parameter to the image extracting unit 22 and the signal processing unit 23. In addition, the playback parameter processing unit 24 generates a playback parameter in response to a user operation through the operation unit 26 and supplies the generated playback parameter to the image extracting unit 22 and the signal processing unit 23. Furthermore, the playback parameter processing unit 24 supplies the playback parameter supplied from the recording and playback unit 21 or the playback parameter generated in response to a user operation through the operation unit 26 to a playback parameter storage unit 25. Thus, the playback parameter is stored in the playback parameter storage unit 25. Still furthermore, the playback parameter processing unit 24 reads out the playback parameter stored in the playback parameter storage unit 25 and supplies the readout playback parameter to the recording and playback unit 21. Thus, the playback parameter is recorded on the recording medium 4.

The playback parameter storage unit 25 temporarily stores the playback parameter supplied from the playback parameter processing unit 24. The operation unit 26 is operated by a user when the user instructs playback or edit of the image (the large-size image) recorded on the recording medium 4. The operation unit 26 supplies an operation signal in accordance with the user operation to the recording and playback unit 21 or the playback parameter processing unit 24.

Figure 5:
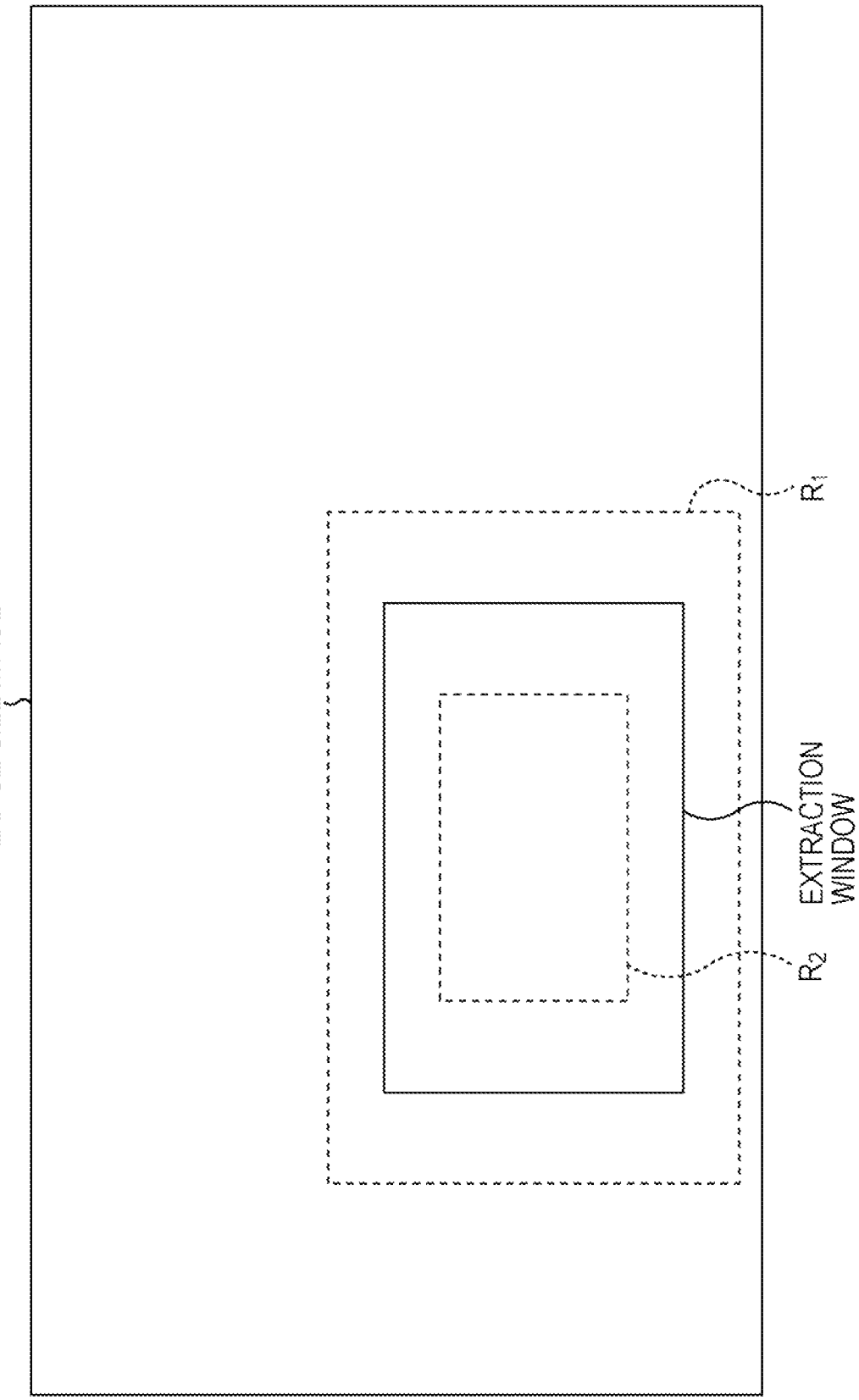
FIG. 5 is a diagram illustrating a process performed by an image extracting unit 22.

A process performed by the image extracting unit 22 shown in FIG. 4 is described next with reference to FIG. 5.

As mentioned earlier, in the image pickup apparatus 1, a large-size image containing not only a scene (a scene captured in the normal image) that the user recognizes to capture but also other scenes is recorded on the recording medium 4 together with the playback parameter.

For the image pickup apparatus 1, when the playback parameter recorded on the recording medium 4 is defined as a playback parameter during image capturing, the playback parameter during the image capturing contains information indicative of the region corresponding to the normal image in the large-size image. Accordingly, the region indicated by the information serves as an extraction window. Thus, as shown in FIG. 5, by extracting the image in the extraction window from the large-size image as an extraction image and displaying the extraction image, an image containing the scene that is the same as that of the normal image can be displayed.

When a user performs a zoom-out operation on the image pickup apparatus 1 and captures an image, the angle of view of the normal image obtained through the image capturing is wide. Accordingly, as indicated by $R_1$ in FIG. 5, the region corresponding to the normal image in the large-size image has a large size, and therefore, the extraction window has a large size.

In contrast, when the user performs a zoom-in operation on the image pickup apparatus 1 and captures an image, the angle of view of the normal image obtained through the image capturing is small. Accordingly, as indicated by $R_2$ in FIG. 5, the region corresponding to the normal image in the large-size image has a small size, and therefore, the extraction window has a small size.

As described above, the size of the extraction window is not always constant. Accordingly, the number of pixels of the extraction image extracted from the large-size image using such an extraction window is not always constant.

On the other hand, since the display unit 3 displays an image having a predetermined number of pixels, the image extracting unit 22 needs to convert the extraction image extracted from the large-size image to an image having the predetermined number of pixels that the display unit 3 can display.

To convert an extraction image having some number of pixels to an extraction image having a different number of pixels, the pixels can simply be thinned out or can be interpolated. Alternatively, the adaptive classification technique previously proposed by the present inventor can be applied.

In the adaptive classification technique, a first image is converted to a second image through an image conversion process. Each of the pixels of the second image is considered to be a pixel of interest. Subsequently, each pixel of interest (i.e., the pixel value of each pixel of interest) can be obtained using a tap coefficient appropriate for each of classes of the pixels of interest and the first image.

That is, in the adaptive classification technique, the pixel value of a pixel of the first image that is spatially or temporally located in the vicinity of a pixel of interest is defined as a prediction tap for estimating the pixel value of the pixel of interest. Additionally, a tap coefficient is obtained for each of predetermined classes by learning. By performing a predetermined estimation calculation using the prediction tap and the tap coefficient, the pixel value (the estimated pixel value) of the pixel of interest can be obtained.

In this example, a linear first-order estimation calculation is employed for the predetermined estimation calculation. Then, a pixel value y of the second image can be obtained using the following first-order linear equation:

$$y = \sum_{n=1}^{N} w_n x_n \tag{1}$$

In equation (1), $X_n$ denotes the pixel value of a nth pixel of the first image that constitutes a prediction tap for a pixel (the pixel value of a pixel) y of the second image, $w_n$ denotes a nth tap coefficient multiplied by the pixel value of the nth pixel of the prediction tap. Note that, in equation (1), the prediction tap includes N pixels (pixel values of the pixels) $x_1, x_2, \ldots, x_N$ of the first image.

Alternatively, the pixel (the pixel value of a pixel) y of the second image can be obtained using a second-order or higher equation in place of first-order linear equation (1).

Let $y_k$ denote a true value of the pixel value of a kth pixel of the second image, and $y_k''$ denote the estimated value of the true value $y_k$ obtained using equation (1). Then, an estimation error $e_k$ of the estimated value $y_k'$ can be expressed as follows:

$$e_k = y_k - y_k' \tag{2}$$

Since the estimated value $y_k'$ in equation (2) can be obtained by using equation (1), the following equation can be obtained by substituting equation (1) into $y_k'$ of equation (2):

$$e_k = y_k - \left(\sum_{n=1}^{N} w_n x_n, k\right) \tag{3}$$

In equation (3), $x_{n,k}$ denotes an nth pixel (the pixel value of the nth pixel) that constitutes the prediction tap for the kth pixel of the second image.

A tap coefficient $w_n$ making the estimation error $e_k$ in equation (3) (or (2)) zero is optimal for estimating the pixel value of the second image. However, in general, it is difficult to obtain such a tap coefficient $w_n$.

Accordingly, as a rule for determining whether the tap coefficient $w_n$ is optimal, the least-squares method is used, for example. In this way, the optimal tap coefficient $w_n$ can be determined by minimizing a sum E of squared errors represented in the following equation:

$$E = \sum_{k=1}^{K} e_k^2 \tag{4}$$

In equation (4), K denotes the number of samples of pairs consisting of a pixel $y_k$ of the second image and a set of pixels $x_{1,k}, x_{2,k}, \ldots x_{N,k}$ that constitute the prediction tap for the pixel $y_k$, that is, K denotes the number of samples used for learning in order to obtain the tap coefficient $w_n$.

As can be seen from equation (5), the minimum value of the sum E of squared errors in equation (4) is expressed as a value $w_n$ making the result of partial differentiation of the sum E with respect to the tap coefficient $w_n$ zero:

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \ (n = 1, 2, \ldots, N) \tag{5}$$

Accordingly, as a result of partial differentiation of equation (3) with respect to the tap coefficient $w_n$, the following equations can be obtained:

$$\frac{\partial e_k}{\partial w_1} = -x_{1,k}, \tag{6}$$

$$\frac{\partial e_k}{\partial w_2} = -x_{2,k}, \ldots ,$$

$$\frac{\partial e_k}{\partial w_N} = -x_{N,k}, (k = 1, 2, \ldots, K)$$

From equations (5) and (6), the following equations can be obtained:

$$\sum_{k=1}^{K} e_k x_1, k = 0, \tag{7}$$

$$\sum_{k=1}^{K} e_k x_{2,k} = 0, \ldots$$

$$\sum_{k=1}^{K} e_k x_{N,k} = 0,$$

By substituting equation (3) into $e_k$ in equation (7), equation (7) can be expressed as the following normal equation:

$$\begin{bmatrix} \left(\sum_{k=1}^{K} x_{1,k} x_{1,k}\right) & \left(\sum_{k=1}^{K} x_{1,k} x_{2,k}\right) & \ldots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \ldots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \ldots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \tag{8}$$

Normal equation (8) can be resolved with respect to the tap coefficient $w_n$ by means of, for example, the sweep-out method (Gauss-Jordan elimination method).

In the adaptive classification process, from the first and second images, a plurality of pairs consisting of a pixel $y_k$ of the second image and a set of pixels $x_{1,k}, x_{2,k}, \ldots x_{N,k}$ that constitute the prediction tap for the pixel $y_k$ are prepared as learning samples. By generating the normal equation given by equation (8) for each of the classes using these learning samples and resolving the normal equation, a learning process is performed in advance so that an optimal tap coefficient $w_n$ (the tap coefficient that minimizes the sum E of squared errors in this example) is obtained. Thereafter, by performing an estimation computation using equation (1) and the obtained tap coefficient $w_n$, the first image can be converted to the second image.

That is, in the learning process, each pixel $y_k$ of the second image is defined as a pixel of interest. The pixel $y_k$ is classified into one of a plurality of classes. This classification is performed on the basis of, for example, the distribution of the pixel values of several pixels of the first image that are spatially or temporally located in the vicinity of the pixel $y_k$.

Subsequently, in the learning process, the normal equation given by equation (8) is generated for each class using the pixel of interest (the pixel value of the pixel of interest) $y_k$ belonging to the class and the pixels $x_{1,k}, x_{2,k}, \ldots x_{N,k}$ of the first image that constitute the prediction tap for the pixel $y_k$. After the normal equations given by equation (8) for each class using all the learning samples are generated, the normal equation for each class is resolved. Thus, the tap coefficient $w_n$ for each class can be obtained.

Thereafter, in the adaptive classification technique, to compute a given pixel (the pixel value of the given pixel) of the second image, that pixel is defined as a pixel of interest. As in the learning process, the pixel of interest is classified so that a class to which the pixel of interest belongs can be obtained. Furthermore, the estimation computation given by equation (1) is performed using the tap coefficient $w_n$ for the class to which the pixel of interest belongs and pixels $x_{1,k}, x_{2,k}, \ldots x_{N,k}$ of the first image that constitute the prediction tap for the pixel of interest. In this way, the pixel of interest (the estimated pixel value of the pixel of interest) can be obtained.

By using a first image acquired by thinning out the pixels of the second image in the learning process, a tap coefficient $w_n$ for converting an image to an image having the number of pixels greater than that of the original image can be obtained. In addition, by using a second image acquired by thinning out the pixels of the first image in the learning process, a tap coefficient $w_n$ for converting an image to an image having the number of pixels less than that of the original image in the adaptive classification process can be obtained.

Furthermore, by using a first image acquired by adding noise to the second image in the learning process, a tap coefficient $w_n$ for converting an image to an image without the noise in the adaptive classification process can be obtained.

Thus, according to the adaptive classification technique, in addition to converting the number of pixels of an image, signal processing for removing noise (for performing noise reduction) can be performed by changing the tap coefficient $w_n$ obtained by different learning processes.

In addition, the adaptive classification technique can be used for converting the above-described image having an annular shape to a central projection image.

The image extracting unit 22 performs an image conversion process for converting the extraction image extracted from the large-size image to an extraction image having the number of pixels that the display unit 3 can display using, for example, the above-described adaptive classification technique. Subsequently, the image extracting unit 22 supplies the resultant extraction image to the signal processing unit 23.

The operation of the playback apparatus 2 shown in FIG. 4 is described next with reference to a flow chart shown in FIG. 6.

When the user operates the operation unit 26 so as to power on the playback apparatus 2, the playback parameter processing unit 24, at step S21, determines whether the operation mode of the playback apparatus 2 is a playback mode.

Examples of the operation mode of the playback apparatus 2 include a playback mode in which an image recorded on the recording medium 4 is played back and an edit mode in which the image is edited. The user can select (set) the operation mode of the playback apparatus 2 by, for example, operating the operation unit 26.

If, at step S21, it is determined that the operation mode of the playback apparatus 2 is a playback mode, the process proceeds to step S22. At step S22 and steps subsequent to step S22, processing in the playback mode is performed.

That is, in the processing in the playback mode, at step S22, the playback parameter processing unit 24 selects a parameter set that is used for playing back the image recorded on the recording medium 4.

Here, the parameter set includes a series of playback parameters. When the large-size image captured by the image pickup apparatus 1 is recorded on the recording medium 4, at least a parameter set including a series of playback parameters (playback parameters during image capturing) generated by the image pickup apparatus 1 (the controller 17 (see FIG. 2) of the image pickup apparatus 1) when the large-size image is captured is recorded on the recording medium 4.

One or more parameter sets can be recorded on the recording medium 4. At step S22, a parameter set used for playing back the image is selected from among the one or more parameter sets.

That is, for example, when the parameter set is recorded on the recording medium 4 in the form of a file, the playback parameter processing unit 24 recognizes the file name of the parameter set recorded on the recording medium 4 by controlling the recording and playback unit 21. In addition, the playback parameter processing unit 24 controls the signal processing unit 23 to display a list of the files of the parameter sets recorded on the recording medium 4 on the display unit 3 together with a prompt message asking for selection of one of the files.

When the user views the file list displayed on the display unit 3 and selects one of the files from the file list by operating the operation unit 26, the playback parameter processing unit 24, at step S22, selects a parameter set identified by the file name as a parameter set used for playing back the image (hereinafter also referred to as a "playback set").

Subsequently, the process proceeds from step S22 to step S23. At step S23, the playback parameter processing unit 24 controls the recording and playback unit 21 to start reconstructing the large-size image and the playback set recorded on the recording medium 4. In this way, the large-size image and the playback set are played back (read out). The large-size image played back is supplied to the image extracting unit 22, and the playback parameter in the playback set is supplied to the playback parameter processing unit 24.

As described in the playback parameter during image capturing, the playback parameter can be present for each of the frames. Unless specifically stated otherwise, playback of the large-size image starts from the temporally earliest frame having the playback parameter thereof.

When the playback of the playback parameter included in the playback set is started at step S23 and the recording and playback unit 21 starts delivering the playback parameter, the playback parameter processing unit 24 starts delivering the playback parameter to the image extracting unit 22 and the signal processing unit 23. Subsequently, the process proceeds to step S24.

At step S24, the image extracting unit 22 starts extracting the extraction image from the large-size image supplied from the recording and playback unit 21 using the playback parameter supplied from the playback parameter processing unit 24.

That is, the large-size image is supplied from the recording and playback unit 21 to the image extracting unit 22, for example, on a frame-to-frame basis. The image extracting unit 22 considers the large-size image sequentially supplied from the recording and playback unit 21 to be a frame of interest. Thus, the image extracting unit 22 extracts an extraction image from the frame of interest and supplies the extraction image to the signal processing unit 23.

More specifically, when the playback parameter supplied from the playback parameter processing unit 24 contains a playback parameter corresponding to the frame of interest (hereinafter also referred to as a "corresponding parameter"), the image extracting unit 22 extracts, from the frame of interest, an image in the extraction window identified by information contained in the corresponding parameter. In addition, the image extracting unit 22 performs the above-described image conversion process to change the number of pixels as needed. Thereafter, the image extracting unit 22 supplies the extraction image to the signal processing unit 23.

In contrast, when the playback parameter supplied from the playback parameter processing unit 24 does not contain the corresponding parameter of the frame of interest, the image extracting unit 22 extracts an extraction image from the frame of interest using the corresponding parameter of a frame that is the closest to the frame of interest among the frames containing the corresponding parameters thereof.

After the process of step S24 is completed, the process proceeds to step S25. At step S25, the signal processing unit 23 starts image processing on the extraction image (the frame of the extraction image) supplied from the image extracting unit 22 using the playback parameter (the corresponding parameter) supplied from the playback parameter processing unit 24.

That is, the signal processing unit 23 performs the image processing indicated by information contained in the playback parameter supplied from the playback parameter processing unit 24 on the extraction image supplied from the image extracting unit 22. Thereafter, the signal processing unit 23 supplies the extraction image to the display unit 3.

In this way, in the playback mode, the extraction image is extracted from the large-size image using the playback parameter contained in the playback set. Furthermore, using the playback parameter contained in the playback set, image processing is performed on the extraction image. Accordingly, the content of the image (a stream of the image) corresponding to the playback parameter contained in the playback set is displayed on the display unit 3.

Therefore, when, for example, a parameter set for the playback parameter during image capturing is selected as a playback set at step S22, an image similar to the normal image, that is, an image containing a scene that the user intends to be captured (or recorded) and having a resolution similar to that of the normal image (an image similar to that displayed on the display unit 13 of the image pickup apparatus 1 during image capturing) is displayed on the display unit 3.

After the process of step S25 is completed, the process proceeds to step S26. At step S26, the playback parameter processing unit 24 determines whether the operation unit 26 has been operated by the user to stop the playback (to perform the stop operation). If, at step S26, it is determined that the stop operation has not been performed, the process returns to step S26. At step S26 and the subsequent steps, similar processes are repeated.

However, if, at step S25, it is determined that the stop operation has been performed, the process proceeds to step S27. At step S27, the playback parameter processing unit 24 controls the recording and playback unit 21, the image extracting unit 22, and the signal processing unit 23 so that the playback of the large-size image and the playback parameter started at step S23, the extraction of the extraction image started at step S24, and the signal processing on the extraction image started at step S25 are all stopped. Thereafter, the process returns to step S21. At step S21 and the subsequent steps, similar processes are repeated.

In contrast, if, at step S21, it is determined that the operation mode of the playback apparatus 2 is not a playback mode, the process proceeds to step S28. At step S28, the playback parameter processing unit 24 determines whether the operation mode of the playback apparatus 2 is an edit mode.

If, at step S28, it is determined that the operation mode of the playback apparatus 2 is not an edit mode, the process returns to step S21. At step S21 and the subsequent steps, similar processes are repeated.

However, if, at step S28, it is determined that the operation mode of the playback apparatus 2 is an edit mode, the process proceeds to step S29. At step S29 and the subsequent steps, processing in an edit mode is performed.

That is, in the processing in the edit mode, at step S29, the playback parameter processing unit 24 selects a parameter set (a playback set) used for playing back reference image content in a manner similar to, for example, the process of step S22. Thereafter, the process proceeds to step S30.

At step S30, as in the process of step S23, the playback parameter processing unit 24 controls the recording and playback unit 21 to start reconstructing the large-size image and the playback set recorded on the recording medium 4. Thus, the large-size image and the playback set are played back (read out) from the recording medium 4. The large-size image is supplied to the image extracting unit 22, and the playback parameter contained in the playback set is supplied to the playback parameter processing unit 24.

When, at step S30, the playback of the playback parameter contained in the playback set is started, and therefore, delivery of the playback parameter from the recording and playback unit 21 is started, the playback parameter processing unit 24 starts delivering the playback parameter to the image extracting unit 22, the signal processing unit 23, and the playback parameter storage unit 25. Thereafter, the process proceeds to step S31.

At step S31, the playback parameter storage unit 25 starts storing the playback parameter supplied from the playback parameter processing unit 24. Thereafter, the process proceeds to step S32.

At step S32, as in the process of step S24, the image extracting unit 22 starts extracting the extraction image from the large-size image supplied from the recording and playback unit 21 using the playback parameter supplied from the playback parameter processing unit 24. Thereafter, the process proceeds to step S33.

That is, the image extracting unit 22 extracts, from a frame of the large-size image supplied from the recording and playback unit 21, the image in the extraction window identified by information contained in the playback parameter supplied from the playback parameter processing unit 24. In addition, the image extracting unit 22 performs the above-described image conversion process to change the number of pixels as needed. Thereafter, the image extracting unit 22 supplies the extraction image to the signal processing unit 23.

At step S33, as in the process of step S25, the signal processing unit 23 starts image processing on the extraction image supplied from the image extracting unit 22 using the playback parameter supplied from the playback parameter processing unit 24.

That is, the signal processing unit 23 performs the image processing indicated by information contained in the playback parameter supplied from the playback parameter processing unit 24 on the extraction image supplied from the image extracting unit 22. Thereafter, the signal processing unit 23 supplies the extraction image to the display unit 3.

In this way, in the edit mode, a process similar to that in the playback mode except for the process storing the playback parameter in the playback parameter storage unit 25 (the process of step S31) is performed. Accordingly, the content of the image corresponding to the playback set is displayed on the display unit 3.

Subsequently, in the edit mode, the process proceeds from step S33 to step S34. At step S34, the playback parameter processing unit 24 determines whether the user has operated the operation unit 26 to instruct editing.

If, at step S34, it is determined that an edit operation has not been performed, that is, the user has not operated the operation unit 26 to instruct editing, processing at step S35 is skipped and the process proceeds to step S36.

However, if, at step S34, it is determined that an edit operation has been performed, that is, the user has operated the operation unit 26 to instruct editing, the process proceeds to step S35. At step S35, the playback parameter processing unit 24 generates a playback parameter (a new playback parameter) (hereinafter referred to as an "edit parameter") in accordance with the edit operation. The playback parameter serves as a corresponding parameter of a frame of interest of the large-size image when the edit operation is performed. Thereafter, the playback parameter processing unit 24 supplies the generated playback parameter to the image extracting unit 22, the signal processing unit 23, and the playback parameter storage unit 25 in place of the playback parameter supplied from the recording and playback unit 21.

Accordingly, in this case, the image extracting unit 22 extracts, from the large-size image, the image in the extraction window identified by the information contained in the edit parameter supplied from the playback parameter processing unit 24 as an extraction image. The signal processing unit 23 performs image processing indicated by information contained in the edit parameter supplied from the playback parameter processing unit 24 on the extraction image supplied from the image extracting unit 22. Thereafter, the signal processing unit 23 supplies the extraction image to the display unit 3. As a result, an image edited in response to the edit operation is displayed on the display unit 3.

In addition, the playback parameter storage unit 25 stores the edit parameter supplied from the playback parameter processing unit 24.

Figure 7:
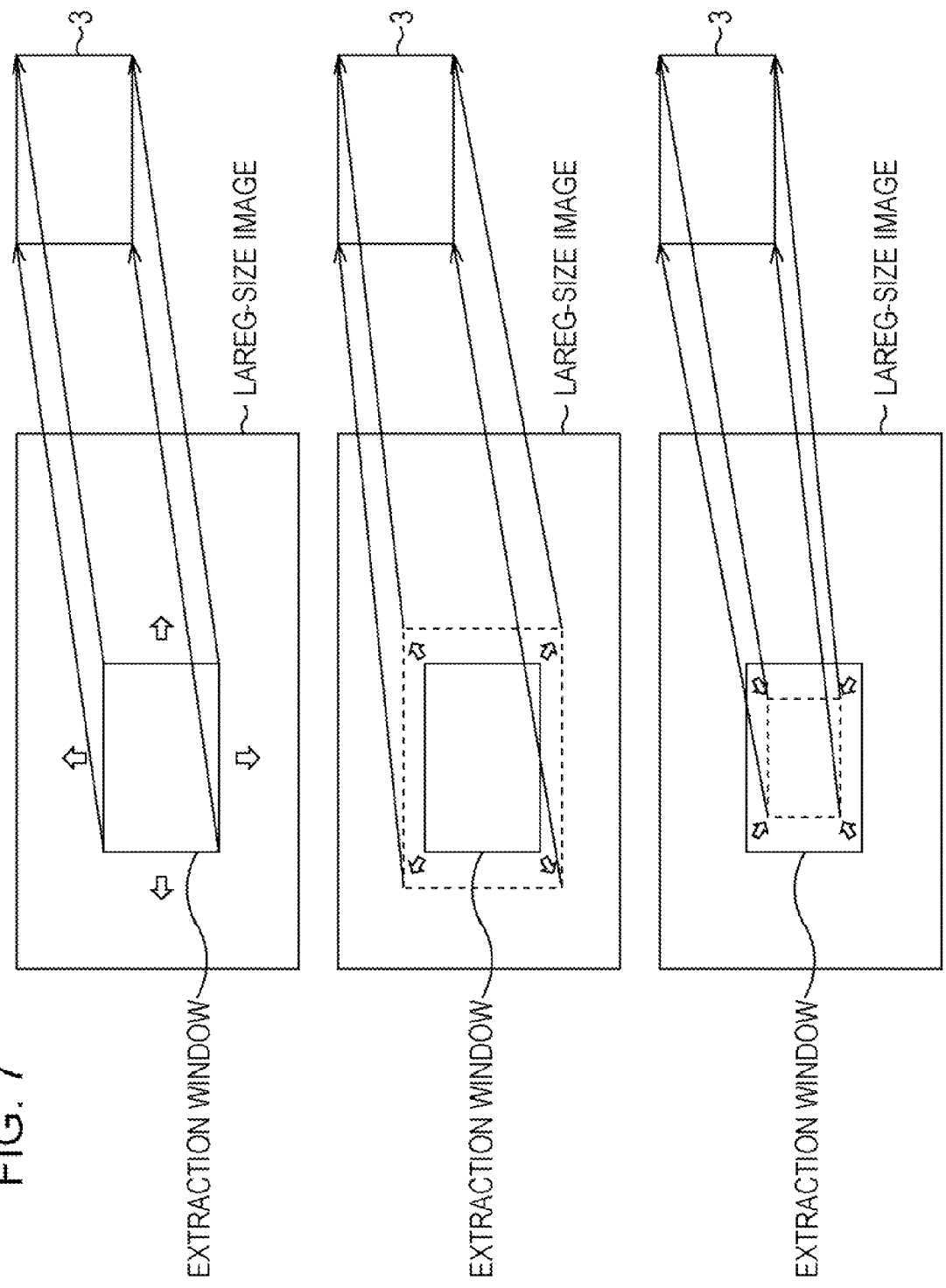
FIG. 7 is a diagram illustrating an edit operation.

The edit operation is now herein described with reference to FIG. 7.

Figure 6:
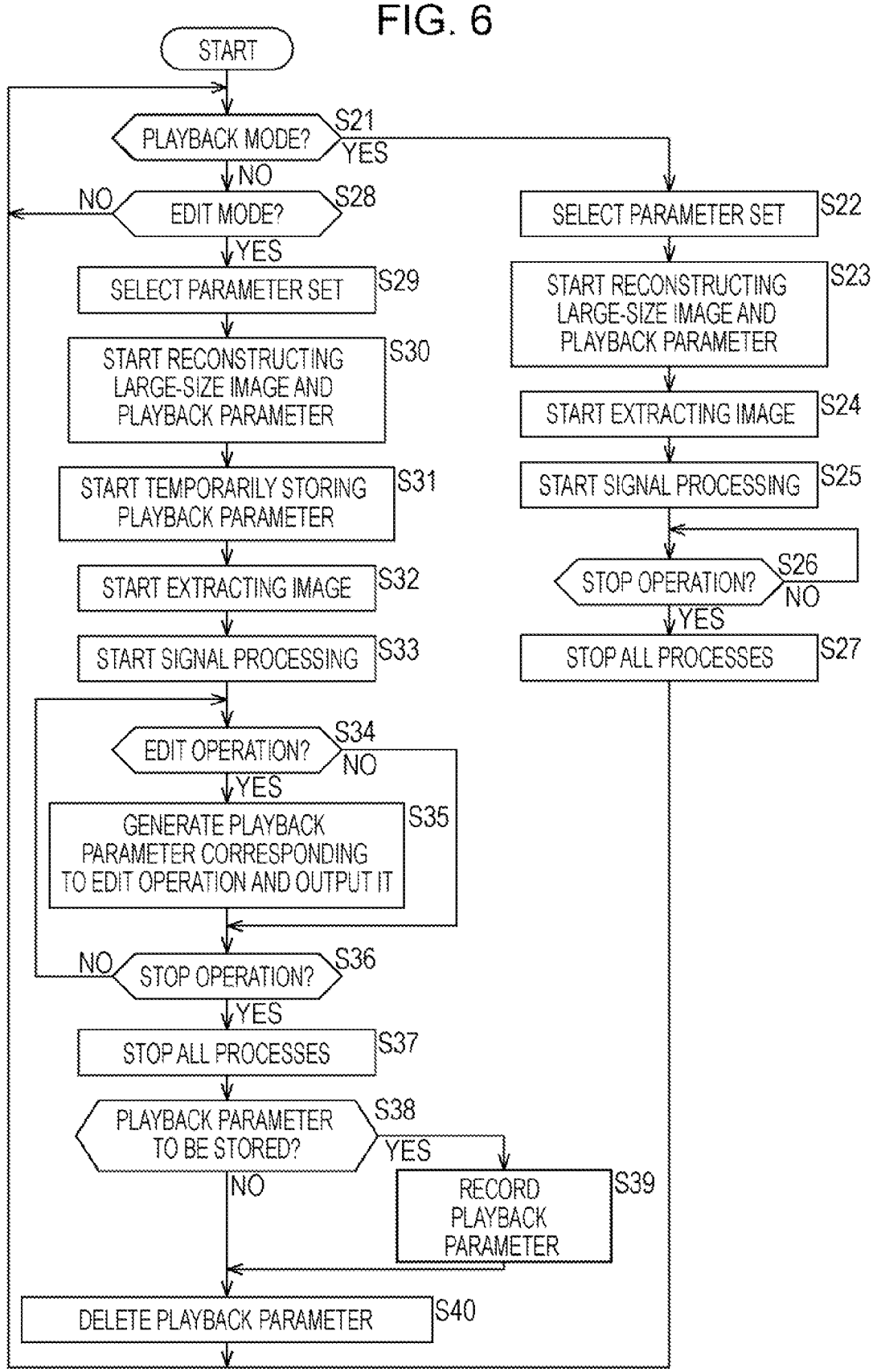
FIG. 6 is a flow chart illustrating the operation of the playback apparatus 2.

At step S29 shown in FIG. 6, when, for example, a parameter set of a playback parameter during image capturing is selected as a playback set, an extraction image is extracted from the large-size image using the playback parameter during image capturing. In addition, image processing is performed on the extraction image using the playback parameter during image capturing. Accordingly, as described above, a normal image (an image similar to the normal image) is displayed on the display unit 3.

As mentioned earlier, since the large-size image is an image that has an angle of view wider than the normal image and that contains a scene captured in the normal image, the large-size image contains a scene other than the scene captured in the normal image.

That is, if a landscape is captured in a normal image, the large-size image contains the landscape captured in the normal image and another landscape that is viewable at the actual site but that is not captured in the normal image.

Accordingly, a landscape that is to be captured by panning or tilting the image pickup apparatus 1 when the image pickup apparatus 1 captures a normal image is captured in the large-size image. In the edit operation, such a pan or tilt operation of the image pickup apparatus 1 can be simulated.

As used herein, the simulated pan operation and tilt operation of the image pickup apparatus 1 are referred to as a pseudo-pan operation and a pseudo-tilt operation, respectively. When, for example, a pseudo-pan operation is performed as an edit operation, the playback parameter processing unit 24 generates an edit parameter serving as a playback parameter including information indicating an extraction window that is identified by the corresponding parameter and that is moved in the horizontal direction in response to the pseudo-pan operation, as shown in a first section of FIG. 7 from the top. In contrast, when a pseudo-tilt operation is performed as an edit operation, the playback parameter processing unit 24 generates an edit parameter serving as a playback parameter including information indicating an extraction window that is identified by the corresponding parameter and that is moved in the vertical direction in response to the pseudo-tilt operation, as shown in the first section of FIG. 7 from the top.

Since the image extracting unit 22 extracts the image in the extraction window from the large-size image as an extraction image in accordance with such an edit parameter, the extraction image contains the landscape that could be captured if the image pickup apparatus 1 were panned or tilted when a normal image is captured.

Furthermore, the edit operation further includes simulated zoom-out or zoom-in operations of the image pickup apparatus 1.

As used herein, the simulated zoom-out operation and zoom-in operation of the image pickup apparatus 1 are referred to as a pseudo zoom-out operation and a pseudo zoom-in operation, respectively. When, for example, a pseudo zoom-out operation is performed as an edit operation, the playback parameter processing unit 24 generates an edit parameter serving as a playback parameter including information indicating an extraction window that is identified by the corresponding parameter and that is expanded in response to the pseudo-zoom-out operation, as shown in a second section of FIG. 7 from the top. In contrast, when a pseudo zoom-in operation is performed as an edit operation, the playback parameter processing unit 24 generates an edit parameter serving as a playback parameter including information indicating an extraction window that is identified by the corresponding parameter and that is shrunk in response to the pseudo zoom-in operation, as shown in the second section of FIG. 7 from the top.

Since the image extracting unit 22 extracts the image in the extraction window from the large-size image as an extraction image in accordance with such an edit parameter, the extraction image contains the landscape that could be captured if the image pickup apparatus 1 is zoomed out or zoomed in when a normal image is captured.

That is, when the pseudo zoom-out operation is performed, the extraction window is expanded. Accordingly, the image extracting unit 22 extracts a wide-angle image from the large-size image as an extraction image. As a result, an image (an extraction image) having a wide angle of view as if the image were captured after the image pickup apparatus 1 was zoomed out is displayed on the display unit 3. In contrast, when the pseudo zoom-in operation is performed, the extraction window is shrunk. Accordingly, the image extracting unit 22 extracts a narrow-angle image from the large-size image as an extraction image. As a result, an image (an extraction image) having a narrow angle of view as if the image were captured after the image pickup apparatus 1 was zoomed in is displayed on the display unit 3. That is, the image of a close-up object is displayed on the display unit 3.

The number of pixels of the extraction image changes in accordance with the size of the extraction window. As the size of the extraction window reduces, the number of pixels is decreased. Accordingly, when the extraction window is shrunk by the pseudo zoom-in operation, the resolution of the extraction image displayed on the display unit 3 deteriorates. However, as mentioned earlier, the large-size image has a resolution higher than that of the normal image. Therefore, even when the extraction window is shrunk to some extent, the resolution of the extraction image extracted from the large-size image through the extraction window can be maintained at a level greater than a certain level (e.g., substantially the same level as the normal image).

When a pseudo-pan operation, a pseudo-tilt operation, or a pseudo zoom-out operation is performed, an image containing a scene that is not captured in the normal image is displayed on the display unit 3. Accordingly, even when the user who captured an image using the image pickup apparatus 1 missed some scene during image capturing, the user can view the scene if the scene is captured in the large-size image.

The edit operation can further include an operation for selecting signal processing performed on a normal image by the normal signal processing unit 12 in addition to the above-described operation for changing the extraction window.

That is, in the image pickup apparatus 1 (see FIG. 2), the large-size image is recorded on the recording medium 4 without being subjected to the image processing that is performed on the normal image by the normal signal processing unit 12.

In the playback apparatus 2, when a parameter set of a playback parameter during image capturing is selected as a playback set, an extraction image is extracted from the large-size image on the basis of the playback parameter during image capturing. In addition, image processing is performed on the extraction image on the basis of the playback parameter during image capturing. Accordingly, signal processing similar to that performed on the normal image by the normal signal processing unit 12 is performed on the extraction image. As a result, an image similar to the normal image is displayed on the display unit 3.

In contrast, when a user selects an edit operation to perform signal processing on the extraction image, the playback parameter processing unit 24 generates an edit parameter serving as a playback parameter containing information about the details of the signal processing in accordance with the edit operation. Thereafter, the playback parameter processing unit 24 supplies the edit parameter to the signal processing unit 23. Upon receiving the edit parameter from the playback parameter processing unit 24, the signal processing unit 23 performs signal processing indicated by the information contained in the edit parameter.

Examples of the signal processing performed by the normal signal processing unit 12 include a variety of types of signal processing, such as noise reduction and image stabilization. An encoding process (e.g., an MPEG encoding process) is also included. Furthermore, for example, the noise-reduction signal processing includes a variety of types of method (algorithm). Accordingly, the type of signal processing performed by the normal signal processing unit 12 is not always suitable (optimum) for the user. Furthermore, even when the type of signal processing performed by the normal signal processing unit 12 is suitable for the user, the type of method may not be suitable for the user.

When, for example, noise-reduction signal processing is performed, a noise component contained in the image is removed. However, at the same time, a few signal components may be lost. Accordingly, in the image pickup apparatus 1, after signal processing is performed on the large-size image captured by the wide-angle camera unit 14 and the large-size image is recorded on the recording medium 4, the playback apparatus 2 can perform signal processing only on the large-size image recorded on the recording medium 4. It follows that the playback apparatus 2 performs signal processing on the large-size image whose signal components are somewhat lost due to the signal processing performed by the image pickup apparatus 1.

However, when signal processing is performed on the large-size image whose signal components are somewhat lost, the result of the signal processing is affected by the lost signal components.

Accordingly, to prevent such a negative impact on the signal processing performed by the playback apparatus 2, the image pickup apparatus 1 records a large-size image on the recording medium 4 without performing signal processing similar to the signal processing performed on a normal image by the normal signal processing unit 12.

Therefore, the playback apparatus 2 can perform the signal processing using all the signal components of the large-size image captured by the wide-angle camera unit 1 of the image pickup apparatus 1 efficiently.

Referring back to FIG. 6, at step S35, after the edit parameter is supplied to the image extracting unit 22, the signal processing unit 23, and the playback parameter storage unit 25, the process proceeds to step S36. At step S36, the playback parameter processing unit 24 determines whether the operation unit 26 has been operated by the user to stop the playback (i.e., whether a stop operation has been performed by the user). If, at step S36, it is determined that a stop operation has not been performed, the process returns to step S34. Subsequently, similar processes are repeated.

However, if, at step S36, it is determined that a stop operation has been performed, the process proceeds to step S37. At step S37, the playback parameter processing unit 24 controls the recording and playback unit 21, the image extracting unit 22, and the signal processing unit 23 to stop the playback of the large-size image and the playback parameter started at step S30, the extraction of the extraction image started at step S32, and the signal processing on the extraction image started at step S33. In addition, the playback parameter processing unit 24 stops storing the playback parameter in the playback parameter storage unit 25 started at step S31.

Subsequently, the process proceeds from step S37 to step S38. At step S38, the playback parameter processing unit 24 determines whether the parameter set, which is a set of the playback parameters stored in the playback parameter storage unit 25, is newly recorded (stored) on the recording medium 4.

That is, the playback parameter processing unit 24 controls the signal processing unit 23 to display a prompt message asking whether the new parameter set is stored or not on the display unit 3. When the user operates the operation unit 26 to reply to the prompt message, the playback parameter processing unit 24 determines whether the new parameter set stored in the playback parameter storage unit 25 is recorded on the recording medium 4.

If, at step S38, it is determined that the new parameter set stored in the playback parameter storage unit 25 is recorded on the recording medium 4, that is, if the user operates the operation unit 26 to reply to the prompt message so that the new parameter set is recorded, the process proceeds to step S39. At step S39, the playback parameter processing unit 24 reads out the new parameter set stored in the playback parameter storage unit 25 and controls the recording and playback unit 21 to record the new parameter set on the recording medium 4. Thereafter, the process proceeds to step S40.

However, if, at step S38, it is determined that the new parameter set stored in the playback parameter storage unit 25 is not recorded on the recording medium 4, that is, if the user operates the operation unit 26 to reply to the prompt message so that the new parameter set is not recorded, the processing of step S39 is skipped and the process proceeds to step S40. At step S40, the playback parameter processing unit 24 deletes (erases) the new parameter set stored in the playback parameter storage unit 25. Thereafter, the process returns to step S21. Subsequently, similar processes are repeated.

The new parameter set recorded on the recording medium 4 in the edit-mode process can be selected as a playback set. Accordingly, image content corresponding to the playback parameter in the new parameter set can be displayed on the display unit 3.

The processing performed in accordance with the flow chart shown in FIG. 6 is completed when the user operates the operation unit 26 to turn the power off.

As described above, when a user performs an edit operation, an edit parameter (a new playback parameter) is generated in accordance with the edit operation. Thereafter, an image is extracted or signal processing is performed on the basis of the edit parameter. Thus, an image optimum for the user can be provided.

In addition, for a large-size image recorded on the recording medium 4, a plurality of parameter sets may be present. Accordingly, by performing a variety of edit operations and generating a variety of parameter sets, the user can create a variety of image content.

Furthermore, unlike a normal image, a large-size image that is not subjected to signal processing is recorded on the recording medium 4. Accordingly, the user can perform an edit operation using the playback apparatus 2 through a trial and error process so as to acquire image content optimized for the user.

The above-described series of processes performed by the playback apparatus 2 can be achieved not only by dedicated hardware but also by software. When the above-described series of processes are executed by software, the programs of the software are installed in, for example, a general-purpose computer.

Figure 8:
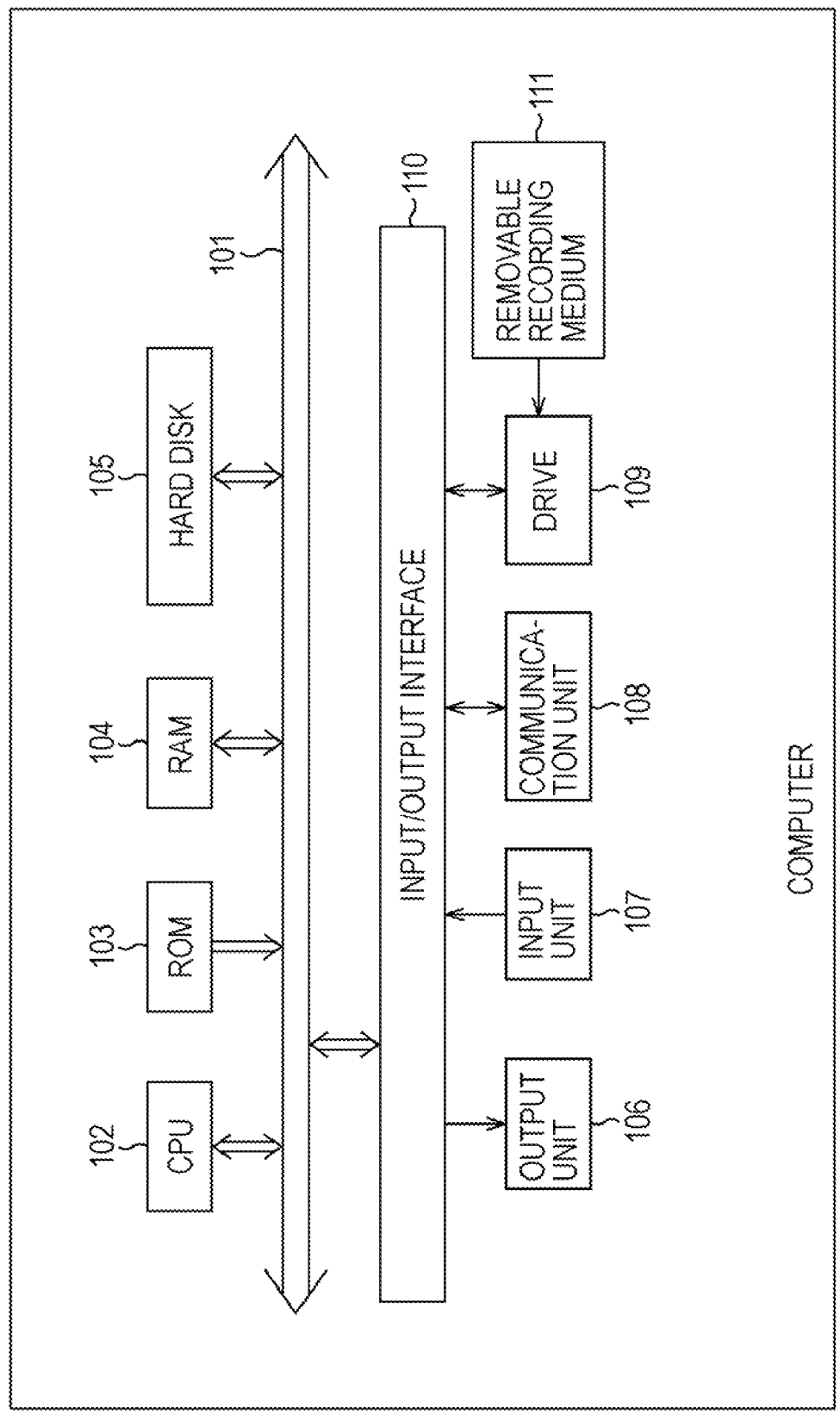
FIG. 8 is a block diagram illustrating an exemplary configuration of a computer according to an embodiment of the present invention.

FIG. 8 illustrates an exemplary configuration of a computer in which a program that executes the above-described series of processes is installed according to an embodiment of the present invention.

The program can be pre-recorded in a hard disk 105 or a ROM 103, which serves as a recording medium incorporated in the computer.

Alternatively, the program can be temporarily or permanently stored (recorded) in the removable recording medium 111, such as a flexible disk, a compact disk-read only memory (CD-ROM), a magneto optical (MO) disk, a digital versatile disk (DVD), a magnetic disk, or a semiconductor memory. Such removable recording medium 111 can be distributed as package software.

In addition to installing the program in the computer from the above-described removable recording medium 111, the program can be wirelessly transferred from a download site to the computer via an artificial satellite for digital satellite broadcast or can be transferred from a download site by wire via a network, such as a local area network (LAN) or the Internet. The computer can receive the program transferred in such a way using a communication unit 108 and can install the program in the hard disk 105 incorporated in the computer.

The computer includes a central processing unit (CPU) 102. An input/output interface 110 is connected to the CPU 102 via a bus 101. Upon receiving an instruction from a user operating an input unit 107 including a keyboard, a mouse, and a microphone via the input/output interface 110, the CPU 102 executes a program stored in the ROM (read only memory) 103 in response to the user instruction. Alternatively or additionally, the CPU 102 loads a program that is stored in the hard disk 105, a program that is transferred via an artificial satellite or a network, is received by the communication unit 108, and is installed the hard disk 105, or a program that is read out from the removable recording medium 111 and is installed in the hard disk 105 into a random access memory (RAM) 104. Subsequently, the CPU 102 executes the program. In this way, the CPU 102 performs the process defined by the flow chart shown in FIG. 6 or the process performed in the configuration indicated by the block diagram shown in FIG. 4. Thereafter, the CPU 102 outputs the result of the process from an output unit 106 including a liquid crystal display (LCD) and a speaker or from the communication unit 108 via the input/output interface 110 as needed. Furthermore, the CPU 102 stores the result of the process in the hard disk 105 as needed.

In the present specification, the steps that describe the program for causing the computer to perform a variety of processing include not only processes executed in the above-described sequence indicated by the flow charts, but also processes that may be executed in parallel or independently (e.g., parallel processing or object-oriented processing).

Furthermore, the program may be executed by one computer or may be distributedly executed by a plurality of computers. Still furthermore, the program may be transferred to a remote computer and may be executed by the remote computer.

While the present embodiment has been described with reference to the wide-angle camera unit 14 of the image pickup apparatus 1 in which a wide-angle image captured by the wide-angle camera unit 14 is converted to a central projection image, the conversion may be performed by the playback apparatus 2, not the image pickup apparatus 1.

Furthermore, the image pickup apparatus 1 and the playback apparatus 2 can be integrated together.

Still furthermore, according to the present embodiment, recording of the large-size image on the recording medium 4 is performed before a recording operation is performed and after a stop operation corresponding to the recording operation is performed. That is, the large-size image contains temporally preceding and succeeding scenes of the scene that the user intended to be captured. An edit operation in which such a scene can be retrieved is available.

While an exemplary embodiment of the present invention has been described with reference to a normal image and a large-size image having the same frame rate, the frame rate of the large-size image can be higher than that of the normal image.

Still furthermore, while an exemplary embodiment of the present invention has been described with reference to the image pickup apparatus 1 including the normal camera unit 11 and the wide-angle camera unit 14 to capture both a normal image and a large-size image, the image pickup apparatus 1 may not include the normal camera unit 11 so that only a large-size image is captured by the wide-angle camera unit 14. In this case, the image pickup apparatus 1 (the controller 17 of the image pickup apparatus 1) can set an extraction window in accordance with a pan operation, a tilt operation, and a zoom operation of the image pickup apparatus 1 performed by the user. By extracting an extraction image from the large-size image using the extraction window, performing signal processing on the extraction image using the normal signal processing unit 12, and supplying the extraction image to the display unit 13, an image (the extraction image) similar to the normal image can be displayed on the display unit 13.

Yet still furthermore, while an exemplary embodiment of the present invention has been described with reference to the image pickup apparatus 1 in which a large-size image and the playback parameter are recorded on the recording medium 4, the application is not limited thereto. For example, the large-size image and the playback parameter may be included in a television program and may be broadcasted from a broadcasting station. The playback apparatus 2 may receive the television program and may record the large-size image and the playback parameter on the recording medium 4.

The invention claimed is:

1. An information processing apparatus comprising:
    playback control means for generating a second image and a playback parameter from a data recording medium that records the second image and the playback parameter, the second image having an angle of view wider than that of a first image and a resolution higher than that of the first image, at least the entirety of an area of a scene captured in the first image being captured in the second image, the playback parameter including information at least indicative of a region of the second image in which the area of a scene captured in the first image is captured;
    extracting means for extracting at least a partial image of the second image and outputting the image as an extraction image;
    playback parameter generating means for generating a new playback parameter in accordance with a user operation; and
    recording control means for recording the new playback parameter;
    wherein, when the new playback parameter is generated, the extracting means extracts the extraction image on the basis of the new playback parameter.

2. The information processing apparatus according to claim 1, wherein the playback parameter further includes information indicative of the details of signal processing to be performed on the extraction image, and wherein the information processing apparatus further comprises signal processing means for performing signal processing on the extraction image on the basis of the playback parameter, and wherein, when the new parameter is generated, the signal processing means performs signal processing on the extraction image on the basis of the new playback parameter.

3. A method for processing information, comprising the steps of:
    reconstructing a second image and a playback parameter from a data recording medium that records the second image and the playback parameter, the second image having an angle of view wider than that of a first image and a resolution higher than that of the first image, at least the entirety of an area of a scene captured in the first image being captured in the second image, the playback parameter including information at least indicative of a region of the second image in which the area of a scene captured in the first image is captured;
    extracting at least a partial image of the second image and outputting the image as an extraction image;
    generating a new playback parameter in accordance with a user operation; and
    recording the new playback parameter;
    wherein, when the new playback parameter is generated, the extraction image is extracted on the basis of the new playback parameter in the step of extracting at least a partial image of the second image.

4. A non-transitory program recording medium storing a program for causing a computer to perform the steps of:
    reconstructing a second image and a playback parameter from a data recording medium that records the second image and the playback parameter, the second image having an angle of view wider than that of a first image and a resolution higher than that of the first image, at least the entirety of an area of a scene captured in the first image being captured in the second image, the playback parameter including information at least indicative of a region of the second image in which the area of a scene captured in the first image is captured;
    extracting at least a partial image of the second image and outputting the image as an extraction image;
    generating a new playback parameter in accordance with a user operation; and
    recording the new playback parameter;
    wherein, when the new playback parameter is generated, the extraction image is extracted on the basis of the new playback parameter in the step of extracting at least a partial image of the second image.

* * * * *